Patented Oct. 26, 1937

2,096,744

UNITED STATES PATENT OFFICE 2,096,744

HYDROGENATION PRODUCTS OF FOLLICLE HORMONES AND METHOD OF PRODUCING SAME

Friedrich Hildebrandt, Hohen Neuendorf, near Berlin, Germany, and Erwin Schwenk, New York, N. Y., assignors, by mesne assignments, to Schering Corporation, Bloomfield, N. J., a corporation of New Jersey No Drawing. Application October 21, 1933, Serial No. 694,686. In Germany October 27, 1932

27 Claims. (Cl. 260—153)

This invention relates to hormones, and more particularly to hydrogenation products of follicle hormones and methods of producing same.

It is an object of this invention to provide means whereby hydrogenation products of follicle hormones are obtained by subjecting the follicle hormones to the action of agents which are capable of reducing the keto group of the follicle hormones to the secondary alcohol group. The follicle hormones, thereby, take up two hydrogen atoms and are transformed into products which contain the benzene ring, recently assumed by Butenandt to be present in the molecule of the follicle hormones, in not hydrogenated form.

It has been found, that it is possible to produce such compounds for instance by subjecting the starting materials, the follicle hormones to the action of catalytically activated hydrogen thereby avoiding the presence of a substantial excess of hydrogen, and by either using highly diluted alcoholic solutions of the follicle hormones or by employing reduction catalysts of low activity or such ones that do not attack the benzene ring.

Instead of using catalytically activated hydrogen one may employ also hydrogen which is activated by other agents or in another manner, such as for instance atomic hydrogen or hydrogen in statu nascendi as it is obtained for instance by the addition of alkali metal to alcoholic solutions of the follicle hormones or by reacting the latter with amalgamated aluminum foils in the presence of water or by reducing them in acid solution by means of metals or in any other manner whereby the keto group of the follicle hormone is reduced to the secondary alcohol group.

Hydrogenation products of follicle hormones having a secondary alcohol group in their molecule can also be obtained by acting on the follicle hormones with compounds containing hydrogen and capable of giving off said hydrogen, in the presence of a hydrogenation catalyst, whereby these compounds are dehydrogenated at the same time. Such compounds are for instance the hydrogenated benzene and naphthalene derivatives, such as cyclohexanol, tetraline and the like, or even the higher hydrogenated follicle hormones which contain a hydrogenated benzene ring, or isoborneol or piperidine or the like.

It is also possible to transform the keto group into the secondary alcohol group by reacting the follicle hormones with alcoholates whereby the keto group of said follicle hormones is reduced to a secondary alcohol group while the alcoholate, at the same time, is oxidized.

Still another method of producing these hydrogenation products consists in first producing the oxime of the follicle hormone, transforming it into the corresponding amine and subjecting the latter to the action of nitrites at elevated temperatures. Thereby also the secondary alcohol is obtained.

The term "follicle hormone" as used hereinafter in the specification and the claims includes all oestrogenous compounds which exhibit the same physiological effects as the follicle hormone of the formula $C_{18}H_{22}O_2$. Other follicle hormones, such as the products accompanying the follicle hormone $C_{18}H_{22}O_2$ in the raw hormone oils which are distinguished from the latter by a lower hydrogen content, may also be used as starting materials. These are for instance the compounds of the formula $C_{18}H_{20}O_2$ and $C_{18}H_{18}O_2$ described by Girard and co-workers in Comptes Rendus 1931, pages 912, 1022. They differ from the follicle hormone by the presence of one or two more double bonds in their molecule; on subjecting these compounds to the action of hydrogen in the same manner as described above, first the unsaturated double bonds are saturated while the benzene ring remains unattacked, and then the keto group is reduced to the secondary alcohol group yielding the same hydrogenation products as the follicle hormone of the formula $C_{18}H_{22}O_2$. The raw hormone oils as they are obtained for instance from placenta or from various kinds of urine, such as the urine of animals in the state of gestation, or preparations obtained from plants or by synthesis may also be subjected to the above described hydrogenation processes.

The follicle hormones which are to be treated in accordance with the present invention may be considered as having the following structural formula:

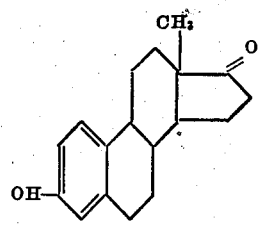

After the hydrogenation the keto group is transformed into a secondary alcohol group in accordance with the following structural formula:

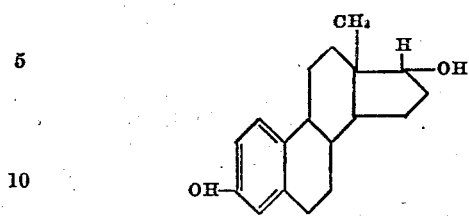

The above formulas merely illustrate but do not limit the present invention which includes other compounds of similar constitution although differing in the number and position of hydrogen atoms.

The term "hydrogenation products of the follicle hormones" includes all compounds obtained by hydrogenation of the follicle hormones in which the benzene ring of the latter is left unattacked while the keto group is transformed into the secondary alcohol group. These new products distinguish themselves over the starting materials by the fact that they exhibit, in spite of the absence of the keto group, a considerably higher physiological efficiency than the starting materials.

Thus, it is possible to transform by this method, for instance, the still rather expensive starting materials, the raw hormone oils and the like, in a cheap and simple manner into physiologically highly effective, therapeutically useful preparations.

While, for instance, the normal follicle hormone exhibits an efficiency of about 4,5 to 5 million mice units per gram, assayed by means of the Allen-Doisy test, the obtained dihydrofollicle hormone is about six times as effective as the starting material, i. e. exhibits 30 million mice units per gram on application in aqueous suspension when assayed under the same conditions as the follicle hormone.

A further advantage of this invention consists in the fact that the unpleasant odor of the starting materials disappears mostly or entirely on hydrogenation.

The following examples serve to illustrate the invention without, however, limiting the same to them:

Example 1

1 gram of the follicle hormone of the formula $C_{18}H_{22}O_2$ is dissolved in 300 cc. of alcohol. 0.5 gram of a nickel catalyst obtained in the usual manner by carefully reducing nickel carbonate by means of hydrogen are added to this solution and hydrogen is introduced into the latter at a pressure of about 20 atmospheres and at a temperature of 120° C. while keeping it in an autoclave provided with stirrer. The reduction is completed after 2 hours. After cooling, the solution is freed from the catalyst by filtration. The reduction product is isolated from the filtrate by adding water thereto. The crude precipitate is purified by repeated crystallization from a small amount of alcohol. The purified product forms beautiful small crystals having a mother-of-pearl-like luster and a melting point of 175–176° C. The analysis indicates a compound of the formula $C_{18}H_{24}O_2$. The optical rotation of this compound is $(\alpha)_D = +74°$ dioxane and $+59.7$ in alcohol. The benzoate has a meeting point of 193° C. and a rotation of $+60$ in alcohol. The hydrogenation product dissolves in concentrated sulfuric acid like the starting material, thereby giving a yellow solution, but its color of fluorescence is a different one, especially on investigating by means of the quartz lamp; for, it is of a light blue shade. On physiologically assaying the hydrogenation product according to the Allen-Doisy test, it was found to have an efficiency of about 30 million mice units per gram.

Besides this product, another one of the melting point 215–216° C. is obtained which is stereoisomeric with the former. The optical rotation of this compound is $(\alpha)_D = 56.7°$ in alcohol. The benzoate has a melting point of 150–151° C.

Example 2

1 gram of a crude crystalline follicle hormone is dissolved in 300 cc. of cyclohexanol and is reduced in an autoclave at 140° C. and a pressure of 40 atmospheres in the presence of 1 gram of a previously reduced nickel catalyst. After the required amount of hydrogen has been absorbed, the reaction solution is freed from the catalyst, evaporated in vacuo, the residue is dissolved in ether and the ethereal solution is thoroughly shaken with aqueous potassium hydroxide solution. On acidifying the alkaline extract a white crystalline precipitate separates which melts at about 190–196° C. and exhibits, according to the Allen-Doisy test, an efficiency of 25 million mice units per gram.

Example 3

A solution of 1 gram of follicle hormone of the melting point 240° C. (a crude crystallizate, as it is obtained directly from the brown hormone oils) in about 100 times its weight of amyl alcohol is heated to the boiling point. 1 gram of finely cut sodium metal is gradually added to this yellow solution, which decolorizes during the course of the reaction and as soon as the reaction has come to an end, solidifies on cooling to an oil intermingled with crystals. Water is added hereto, the mixture is acidified and the amyl alcohol is driven off by steam distillation. A crumby resinous mass remains which is dissolved in ether. The ethereal solution is shaken thoroughly with sodium hydroxide and yields on evaporation a brownish resinous mass. The alkaline solution gives on precipitation with acid also a resinous product which gradually solidifies. On sublimation in a high vacuum and recrystallization a product of the melting point 167–170° C. is obtained from this resinous product, representing the hydrogenation product. The latter dissolves in sulfuric acid with a yellowish-green color. This solution, on illumination by a quartz lamp, exhibits the characteristic blue fluorescence of the dihydrofollicle hormone.

Example 4

1 gram of follicle hormone is dissolved in 200 cc. of acetic acid ester saturated with water and is thoroughly shaken with amalgamated aluminum foil. The acetic acid ester solution is evaporated after the reaction is brought to an end and the remaining residue is purified in the same manner as described in Example 3.

Example 5

1 gram of follicle hormone is dissolved in 100 cc. of glacial acetic acid. A trace of palladium chloride is added to this solution. Then small portions of a good type of zinc dust (about 20 times of the calculated amount) are added within two hours to the solution, the reaction between the zinc and acetic acid producing hydrogen at substantially normal atmospheric pressure, whereafter the reaction mixture is boiled until the greater part of the zinc dust is dissolved. Thereafter the undissolved zinc dust is filtered off, water is added to the filtrate and the precipitated resinous reaction product is dissolved in alcohol. The same amount of semicarbazide chlorohydrate dissolved in alcohol, and the corresponding amount of potassium acetate are added to this alcoholic solution, and the reaction mixture is allowed to stand for 48 hours whereafter the precipitated, difficultly soluble follicle hormone semicarbazone is filtered off. The purified reduction product is precipitated by adding water to the mother lignon. It may be further purified by recrystallization.

*Example 6*

The equilin of the formula $C_{18}H_{20}O_2$ obtained according to Girard and co-workers, Comptes Rendus 1931, pages 912, 1022 by recrystallization of a larger amount of raw follicle hormone, is dissolved in 100 times its weight of alcohol. To this solution the same amount of a nickel catalyst is added, whereafter hydrogen is reacted with the mixture at 100° C. in an autoclave. As soon as the reaction comes to an end, the catalyst is filtered off and the solution is diluted with water. A precipitate is obtained which yields mostly the dihydrofollicle hormone of the formula $C_{18}H_{24}O_2$ of the melting point 167–170° C. as described in the previous examples.

The same product is obtained by heating hippolin of the formula $C_{18}H_{18}O_2$ in a similar manner.

*Example 7*

A crude hormone preparation obtained by evaporation of urine of pregnant mares and extraction with solvents and having an efficiency of about 60,000 to 80,000 mice units per gram is dissolved in alcohol. About 10 per cent of the weight of the hormone preparation of a nickel catalyst (precipitated from a mixture of the sulfates of nickel and copper by soda and reduced at 300–350° C.) are added to the solution. Thereafter hydrogen is introduced into the solution while keeping the latter at 100–120° C. in an autoclave, until the speed of absorption of the hydrogen is perceptibly diminished. After cooling, the catalyst is filtered off and the alcohol is evaporated. About the same weight of a brown oil is obtained the efficiency of which is three to five times higher than that of the starting material.

*Example 8*

A crude hormone preparation obtained by extraction of placenta by means of organic solvents and having an efficiency of 30,000 mice units per gram, is dissolved in amyl alcohol and is reduced, while boiling, by means of the addition of sodium metal. After introducing half of the weight of the starting material of sodium, the reaction is brought to an end by passing steam through the solution and driving off the amyl alcohol. The aqueous mixture is acidified and extracted with ether in order to free the hormone preparation from the water and salts present. The ethereal extract is evaporated, whereby a brown oil remains the odor of which is appreciably better than that of the starting material and the efficiency of which is three times as high as that of the latter. No substantial loss in weight is observed by this treatment.

A tokokinine preparation, obtained for instance in a known manner by extracting expressed residue of palm kernels, can be hydrogenated in a similar manner. Also in this case the effective units of the preparation are increased three to five times while the amount of the hydrogenated product remains about the same as that of the starting material.

*Example 9*

0.5 gram of the oxime of the follicle hormone is dissolved in alcohol and heated to the boiling point. 1 gram of finely cut sodium metal are gradually added to the boiling solution. After the sodium has been dissolved, the solution is diluted with water and the alcohol is removed from the solution by evaporation in vacuo. Without isolating the obtained amine the mixture is acidified with diluted hydrochloric acid and an aqueous solution of 0.25 gram of potassium nitrite is added thereto. After heating the solution to the boiling point, the reaction product is extracted from the acid solution with ether, the ethereal extract is separated from the water and the ether is evaporated whereby an oily, highly brownish mass remains. The dihydrofollicle hormone of the formula $C_{18}H_{24}O_2$ with a melting point of 168–170° and the typical fluorescence color of its solution in sulfuric acid under the influence of ultraviolet light is obtained from the crude product by recrystallization.

*Example 10*

Equimolecular amounts of cyclohexanol and follicle hormone are heated, while stirring, in an autoclave to about 200° C. in the presence of about 5 per cent of their total weight of a hydrogenation catalyst. The starting of the reaction is indicated by a sudden rise of pressure which is followed after some time by a drop of pressure. After the lapse of a few hours the reaction is interrupted, the products are separated from the catalyst, the cyclohexanone formed as well as the unreacted cyclohexanol are removed by vacuum distillation and the residue is purified by dissolving in alcohol, precipitating the unreacted follicle hormone as semicarbazone and evaporating the alcoholic solution.

Other compounds, for instance, tetrahydronaphthalene or even the higher hydrogenated follicle hormones which, for instance, contain also a hydrogenated benzene ring may be used instead of cyclohexanol.

Since the transformation of the follicle hormones into their hydrogenation products does not always proceed quantitatively and since the reactions is often conducted in such a manner that part of the hormone remains unattacked in order to avoid further hydrogenation to products where also the benzene ring is hydrogenated, the crude reaction products have sometimes to be purified. A very simple method to be employed in this case consists in reacting the crude hydrogenation products with keto reagents, i. e. with compounds which form insoluble or otherwise removable reaction products with the unchanged hormone. Such a method is for instance that described in the above given Example 5, whereby the semicarbazone of the not hydrogenated follicle hormone is produced which crystallizes out of the reaction solution, while the hydrogenation products remain in solution and can be isolated therefrom. Other reagents for the keto group may also be employed.

The invention, of course, is not limited to the examples given above, but various changes may be made in the details disclosed in the foregoing specification in accordance with the principles set forth herein and in the claims annexed hereto.

What we claim, is:—

1. A method of producing hydrogenation products of follicle hormones, obtained from animal or vegetable sources or synthetically, which comprises subjecting said follicle hormones to the action of agents which are capable of reducing the keto group of said follicle hormones to the secondary alcohol group without affecting the benzene ring present in the molecule of the follicle hormones.

2. A method of producing hydrogenation products of follicle hormones, obtained from animal or vegetable sources or synthetically, which comprises subjecting said follicle hormones to the action of activated hydrogen in such a manner that merely the keto group of said follicle hormones is reduced to the secondary alcohol group without the benzene ring present in the molecule of the follicle hormones being affected by the hydrogen.

3. A method of producing hydrogenation products of follicle hormones, obtained from animal or vegetable sources or synthetically, which comprises subjecting said follicle hormones to the action of catalytically activated hydrogen in such a manner that merely the keto group of said follicle hormones is reduced to the secondary alcohol group without the benzene ring present in the molecule of the follicle hormones being affected by the hydrogen.

4. A method of producing hydrogenation products of follicle hormones, obtained from animal or vegetable sources or synthetically, which comprises subjecting said follicle hormones to the action of catalytically activated hydrogen in the presence of hydrogenation catalysts unable to cause hydrogenation of the benzene ring present in said follicle hormones.

5. A method of producing hydrogenation products of follicle hormones, obtained from animal or vegetable sources or synthetically, which comprises subjecting said follicle hormones to the action of catalytically activated hydrogen in the presence of hydrogenation catalysts until hydrogenation products of the follicle hormones of the general formula $C_{18}H_{24}O_2$ are obtained.

6. A method of producing hydrogenation products of follicle hormones, obtained from animal or vegetable sources or synthetically, which comprises acting on said follicle hormones with compounds containing hydrogen in the presence of a hydrogenation catalyst until the keto group of said follicle hormones is reduced to the secondary alcohol group, while said compound containing hydrogen, is dehydrogenated at the same time.

7. A method of producing hydrogenation products of follicle hormones, obtained from animal or vegetable sources or synthetically, which comprises subjecting said follicle hormones to the action of hydrogen in statu nascendi under such conditions as to transform the CO group into a CHOH group without hydrogenating the benzene ring present in the molecule of the follicle hormones.

8. A method of producing hydrogenation products of follicle hormones, obtained from animal or vegetable sources or synthetically, which comprises subjecting said follicle hormones to the action of atomic hydrogen under such conditions as to transform the CO group into a CHOH group without hydrogenating the benzene ring present in the molecule of the follicle hormones.

9. A method of producing hydrogenation products of follicle hormones, obtained from animal or vegetable sources or synthetically, which comprises subjecting said follicle hormones to the action of alcoholates whereby the keto group of said follicle hormone is reduced to a secondary alcohol group, while the alcoholate is oxidized at the same time.

10. A method of producing hydrogenation products of follicle hormones which contain one or two more double bonds in the molecule than the follicle hormones of the formula $C_{18}H_{22}O_2$, which comprises subjecting said unsaturated follicle hormones to the action of agents which are capable of hydrogenating the keto group of said follicle hormones to the secondary alcohol group as well as the double bonds to saturated bonds without affecting the benzene ring present in the molecule of the follicle hormones.

11. A method of producing hydrogenation products of raw follicle hormone preparations obtained from animal or vegetable sources or synthetically, which comprises subjecting said raw follicle hormone preparations to the action of agents which are capable of reducing the keto group of said follicle hormones to the secondary alcohol group without affecting the benzene ring present in the molecule of said follicle hormones.

12. A method of producing hydrogenation products of follicle hormones, obtained from animal or vegetable sources or synthetically, which comprises first producing an oxime of said follicle hormones, subjecting the latter to a reducing treatment and treating the obtained amine with nitrites, so as to produce the hydrogenation products of follicle hormones wherein the keto group is transformed into the secondary alcohol group while the benzene ring present in the molecule of said follicle hormones is unaffected.

13. A method of producing hydrogenation products of follicle hormones, obtained from animal or vegetable sources or synthetically, which comprises subjecting said follicle hormones to the action of agents which are capable of reducing the keto group of said follicle hormones to the secondary alcohol group without affecting the benzene ring present in the molecule of the follicle hormones and purifying the obtained hydrogenation products.

14. A method of producing hydrogenation products of follicle hormones, obtained from animal or vegetable sources or synthetically, which comprises subjecting said follicle hormones to the action of agents which are capable of reducing the keto group of said follicle hormones to the secondary alcohol group without affecting the benzene ring present in the molecule of the follicle hormones and purifying the obtained hydrogenation products by reacting the reaction mixture with keto reagents which combine with the unattacked follicle hormone, and removing said reaction products of keto reagents and follicle hormone from the hydrogenation products.

15. The hydrogenation products of follicle hormones obtained from animal or vegetable sources or synthetically, said hydrogenation products being characterized by a phenolic hydroxy group and a secondary alcohol group in their molecule, the latter being the place of the keto group of the follicle hormones.

16. The hydrogenation products of follicle hormones of the formula $C_{18}H_{24}O_2$ and containing a phenolic hydroxy group and a secondary alcohol group.

17. The hydrogenation products of the follicle hormones having the following general structural formula:

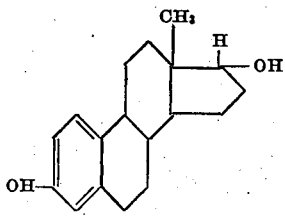

18. Products according to claim 17 in which the CHOH group may be on any one of the free points of the end ring.

19. A hydrogenation product of the follicle hormones having the general formula $C_{18}H_{24}O_2$ and the structural formula

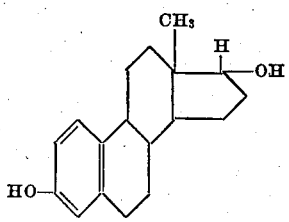

of a melting point of about 175–176° C. and an optical rotation of +59.7° in alcohol, said compound dissolving in concentrated sulfuric acid with yellow color, said solution giving a blue color and fluorescence on exposing it to a quartz lamp, the physiological activity of said compound being about 30 million mouse units per gram on assaying by the Allen-Doisy test.

20. A hydrogenation product of the follicle hormones having the general formula $C_{18}H_{24}O_2$ and the structural formula

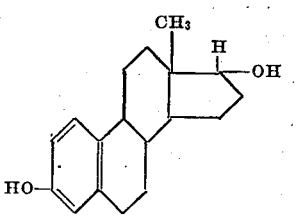

of a melting point of about 215–216° C. and an optical rotation of +56.7° in alcohol, said compound dissolving in concentrated sulfuric acid with yellowish-green color, said solution giving a blue-green color and fluorescence on exposing it to a quartz lamp, the physiological activity of said compound being about 20 million mouse units per gram on assaying by the Allen-Doisy test.

21. Hydrogenation products of the follicle hormones having the general formula $C_{18}H_{24}O_2$ and the structural formula

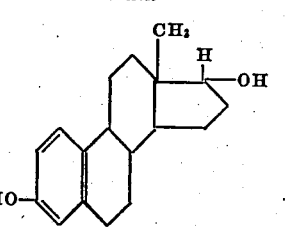

of a melting point substantially below that of the initial follicle hormone and optical rotation of 56.7° to 59.7°, and having a physiological activity substantially greater than that of said follicle hormone, said activity being greater the lower the melting point of said product.

22. Hydrogenation products of the follicle hormones having the general formula $C_{18}H_{24}O_2$ and the structural formula

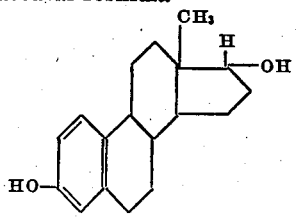

of a melting point of about 175–216° C. and optical rotation of 56.7° to 59.7°, said compounds dissolving in concentrated sulfuric acid with yellow to yellowish-green color and fluorescence on exposing it to a quartz lamp, the physiological activity of said compounds being about 20–30 million mouse units per gram on assaying by the Allen-Doisy test.

23. A hydrogenation product of a crude material containing the follicle hormones having the general formula $C_{18}H_{24}O_2$ and the structural formula

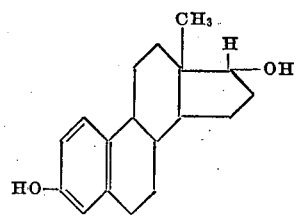

of a melting point substantially below that of the initial follicle hormone, and having a physiological activity substantially greater than that of said follicle hormone, said activity being from 3 to 6 times the activity of the initial hormone containing material.

24. A physiologically effective, therapeutically useful preparation comprising a hydrogenation product of the follicle hormones having the general formula $C_{18}H_{24}O_2$ and the structural formula

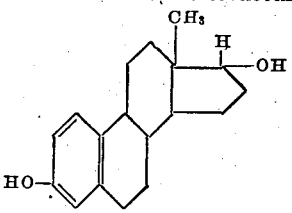

and having a physiological activity several times greater than that of the starting material before hydrogenation.

25. A product suitable for use in therapy and having the physiological properties of the follicle hormone in higher degree comprising the isolated dihydrofollicle hormone, substantially free from higher hydrogenation products of said follicle hormone.

26. A product suitable for use in therapy and having the physiological properties of the follicle hormone in higher degree comprising the isolated dihydrofollicle hormone, substantially free from completely hydrogenated follicle hormone.

27. A substance possessing the herein described physiological characteristics and reactions of the follicle hormone in a degree equal to approximately six times the potency of said follicular hormone and comprising the isolated dihydrofollicle hormone, the benzene ring thereof being unhydrogenated and therefore retaining its female sex hormone-contributing characteristics and the ketone group being hydrogenated into a secondary alcohol group.

FRIEDRICH HILDEBRANDT.
ERWIN SCHWENK.